United States Patent [19]
Lee et al.

[11] Patent Number: 5,783,749
[45] Date of Patent: Jul. 21, 1998

[54] VIBRATING DISK TYPE MICRO-GYROSCOPE

[75] Inventors: Jong-Hyun Lee; Boo-Yeon Choi; Kyung-Ho Park; Hyung-Joun Yoo, all of Daejeon, Rep. of Korea

[73] Assignee: Electronics and Telecommunications Research Institute, Daejeon, Rep. of Korea

[21] Appl. No.: 675,970

[22] Filed: Jul. 5, 1996

[30]  Foreign Application Priority Data

Dec. 7, 1995 [KR] Rep. of Korea ............... 95-47433

[51] Int. Cl.$^6$ .................................................. G01P 9/04
[52] U.S. Cl. ................................................... 73/504.12
[58] Field of Search ........................ 73/504.01, 504.12, 73/504.13, 504.02

[56]  References Cited

U.S. PATENT DOCUMENTS

| | | | |
|---|---|---|---|
| 4,655,081 | 4/1987 | Burdess | 73/504.13 |
| 5,329,815 | 7/1994 | Dunn et al. | 73/504.12 |
| 5,533,394 | 7/1996 | Wan | 73/504.01 |

FOREIGN PATENT DOCUMENTS

| | | | |
|---|---|---|---|
| 6-3153 | 1/1994 | Japan | 73/504.12 |

OTHER PUBLICATIONS

IEEE Publication entitled "A Micromachined comb-drive tuning fork rate gyroscope" pp. 143-148.

*Primary Examiner*—John E. Chapman
*Attorney, Agent, or Firm*—Antonelli, Terry, Stout & Kraus, LLP

[57]  ABSTRACT

A vibrating disk type micro-gyroscope and a method of manufacture thereof are disclosed. The micro-gyroscope includes a support platform for supporting a vibrating disk, the vibrating disk converting a resonance frequency into two beat frequencies, a bottom detection electrode for detecting the angular velocity of the gyroscope from a detection of the electrostatic capacitance changes between the bottom detection electrode and the vibrating disk, and an upper drive electrode for exciting the vibrating disk. The method includes the steps of: depositing an insulator layer, a polycrystalline silicon layer, the bottom detection layer, and the bottom sacrificial layer; dry etching the bottom sacrificial layer; depositing polycrystalline silicon doped with dopants; dry etching every area except the support platform and the vibrating disk; depositing an oxide upper sacrificial layer; and forming a pattern and then wet etching the upper sacrificial layer and the bottom sacrificial layer.

5 Claims, 5 Drawing Sheets

VIBRATING DISK TYPE MICRO-GYROSCOPE

BACKGROUND OF THE INVENTION

1. Field of the Invention

This invention relates to a vibrating disk type micro-gyroscope and fabrication method thereof. More particularly, the invention relates to a vibrating disk type micro-gyroscope measuring angular velocity with high sensitivity and a mass-production method for the same using semiconductor manufacturing processes.

2. Description of the Related Art

Generally, a gyroscope measures an angular velocity. In the past, gyroscopes were mainly used in an inertial navigation system for airplanes or missiles. With the advent of an information-communication era, gyroscopes have drawn considerable attention for their small size and ability to sense a person's mobility for realistic communications. Gyroscopes also have a big market in the area of an automatic driving system of a global positioning system.

Systron company, USA, offers a beam shaped piezoelectric quartz gyroscope which detects change by the Coriolis force but its large size, typically more than 10 mm, limits its usefulness as an angular velocity sensing element for a realistic communication system.

There are also publications about the manufacturing of a small angular velocity sensing element with micro machining in semiconductor production in IEEE MEMS(micro electro mechanical system), 1993. In order to use this angular velocity sensing element, necessary circuitry needs to be integrated with the element because of its small changes of electric capacity, typically $10^{-15}$ Faraday.

All gyroscopes mentioned so far use a tuning fork. When the vertical vibrational energy of a tuning fork is converted to the rotational vibrational energy of the base unit, changes in resonance frequencies occur with temperature variation vary among modes. Thus, all gyroscopes mentioned so far generally cannot offer a stable output.

SUMMARY OF THE INVENTION

This invention aims to solve the shortcomings of the prior art.

A main object of the invention is to provide a vibrating disk type micro-gyroscope for measuring angular velocity with high accuracy and sensitivity.

Another object of the invention is to provide a mass-production method using a micromachining method of semiconductor processes for the vibrating disk type micro-gyroscope for measuring angular velocity with high accuracy and sensitivity.

To implement the invention, a vibrating disk is used having micromachining between an upper drive electrode and a lower detection electrode. The resonance frequency changes to two nearby vibrational frequencies when the vibrating disk rotates and the angular velocity can be measured with high sensitivity if the migration speed of the vibrational mode formed by two nearby vibrational frequencies or beating of the frequencies is measured.

An embodiment of a vibrating disk type micro-gyroscope of the invention includes: a support platform, formed on a silicon wafer near a center of a bottom surface of a vibrating disk, for supporting the vibrating disk; the vibrating disk being supported at the center by the support platform to be spaced a set distance from the silicon wafer for converting a resonance frequency to two nearby frequencies in the presence of external rotation. The electrode structure of the micro-gyroscope includes the bottom electrode coaxial to the vibrating disk, formed in the shape of a circle divided into more than four pairs on the silicon wafer for detecting the angular velocity of the vibrating disk with the electrostatic capacitance change between itself and the vibrating disk; a drive electrode whose one end is divided into more than two pairs formed on the silicon wafer from a set distance from the bottom detection electrode and the vibrating disk in the radial direction and extending and bending sharply at the middle and the other end formed above the vibrating disk in the axial direction for driving the vibrating disk.

Another embodiment of a vibrating disk type micro-gyroscope of the invention includes: a bottom detection electrode formed in the shape of a circle divided into more than four pairs for detecting the angular velocity of the micro-gyroscope by electrostatic capacitance changes between the micro-gyroscope and a vibrating disk; a support platform having a set separation from the circumference of the bottom detection electrode and a ring shape coaxial to the bottom detection electrode, and formed on a silicon wafer for supporting the vibrating disk; the vibrating disk having a set separation from the silicon wafer and the bottom detection electrode, having an outer circumference formed on the support platform and supported by the support platform, for converting a resonance frequency into two nearby frequencies in the presence of the excitation by the electrostatic force formed between the vibrating disk and an upper drive electrode; and the upper drive electrode coaxial to the vibrating disk, having a set separation from the bottom detection electrode and the vibrating disk in the radial direction, whose one end is formed on the silicon wafer in the shape of a circle divided into more than two pairs of parts and each part is supported by the silicon wafer, and extending and bending sharply at the middle toward the center axis, whereby the other end is formed above the vibrating disk with a set separation from the same in the axial direction, for driving the vibrating disk.

In order to minimize the vibrational damping of the vibrating disk by air and achieve high sensitivity with the micro-gyroscope, a sealing structure may be formed over the drive electrode with a set distance from the drive electrode.

Also, it is desirable to have the bottom electrode in the shape of a circle divided into pairs of parts, whose number is more than twice the number of parts of the upper drive electrode in order to detect the rotating direction as well as the angular velocity.

Polycrystalline silicon doped with p-type or n-type dopant is used for the vibrating disk because of its excellent fatigue strength. In order to simplify the manufacturing processes, the same material may be used for the bottom detection electrode and the upper drive electrode.

The manufacturing process of a micro-gyroscope of the invention includes: a bottom detection electrode forming step of depositing an insulator layer composed of nitride and oxide on a silicon wafer, subsequently depositing polycrystalline silicon doped with n-type or p-type dopant on the insulator layer, and subsequently removing most of the deposits except a certain area of deposit by photolithography; a bottom sacrificial layer forming step of depositing oxide layer on all of the area formed by the bottom detection electrode forming step by PECVD(plasma enhanced chemical vapor deposition) in order to obtain a space between a vibrating disk and the bottom detection electrode, and forming a bottom sacrificial layer and exposing the insulator layer between the bottom detection layer by dry etching with a photoresist mask in order to form a support platform for the vibrating disk; a step of depositing polycrystalline silicon doped with the same dopant used to dope the bottom detection electrode, to the bottom sacrificial layer, and dry etching all the area except the support platform and the vibrating disk; depositing an upper sacrificial layer on the support platform and the vibrating disk by PECVD in order to obtain a space between the vibrating disk and the drive electrode; a step of forming a pattern, and depositing polycrystalline silicon doped with the same dopant used to dope the bottom detection electrode on the upper sacrificial layer in order to form the upper drive electrode; and a step of wet etching the upper sacrificial layer and the bottom sacrificial layer in order to obtain a space between the upper drive electrode and the bottom detection electrode.

At this point in order to prevent the adhesion of the bottom detection electrode and the upper drive electrode to the vibrating disk during a drying process after the wet etching step to provide a space surrounded by the vibrating disk, the upper drive electrode, and the bottom detection electrode, vapor etching the upper sacrificial layer and the bottom sacrificial layer may follow the wet etching step.

To maximize the sensitivity of the micro-gyroscope, the vibrational damping due to air needs to be minimized. For this reason, a packaging step installing a sealing structure over the upper drive electrode obtained by the wet etching step for securing the space surrounded by the vibrating disk, the upper drive electrode, and the bottom detection electrode, can be added.

DETAILED DESCRIPTION OF THE PREFERRED EMBODIMENT

A detailed operational principle of a vibrating disk type micro-gyroscope of the invention is described below. The number of circumferential modes is m and the number of radial modes is n as represented as (m,n). The micro-gyroscope of the invention is driven at a frequency $f_{mn}(= \omega_{mn}/2\Pi)$ which is the resonance frequency for the (m, n) to provide an efficient excitation of the vibrator. In this situation, if a silicon wafer, as a base unit of the micro-gyroscope rotates at an angular velocity $\Omega$, two traveling waves occur which are a forward (clockwise) traveling wave and a backward (counterclockwise) traveling wave, of two different resonant frequencies.

This shift of resonant frequencies from the angular velocity $\Omega$ causes migration of the modes which is produced by Coriolis forces to $\Omega_{mn}$ as defined by equation (1) which are referred to hereinafter as beat frequencies.

$$\Omega_{mn} = \frac{(n^2 - 1)}{(n^2 + 1)} \Omega \quad (1)$$

The lower electrode and the micro-gyroscope structure rotates together at the velocity $\Omega$ and the relative angular velocity $\Omega_d$ is given by equation (2). Therefore, the angular velocity $\Omega$ of the gyroscope can be calculated if the beat frequencies of the mode from $\Omega_{mn}$ is measured with detection electrodes 5.

$$\Omega_d = \Omega - \Omega_{mn} = \Omega - \frac{(n^2-1)}{(n^2+1)} \Omega = \frac{2}{(n^2+1)} \Omega \quad (2)$$

As it is apparent by the operational theory as explained above, the resolution of the angular velocity measured with the micro-gyroscope of the invention is not determined by the signal to noise ratio but instead is determined by the sampling frequency of the beat frequencies.

With reference to attached figures, the detailed description of preferred embodiments and the corresponding manufacturing method will be described hereinafter in detail.

Figure 1A:
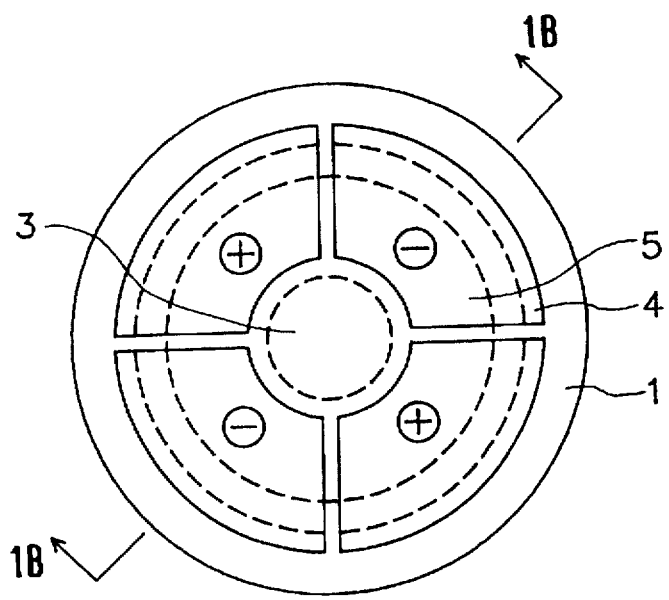
FIG. 1A is a top view for an embodiment of the invention.
Figure 1B:
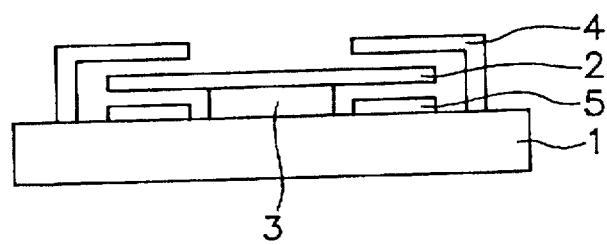
FIG. 1B is a section cut along the line A—A in the FIG. 1A.
Figure 1C:
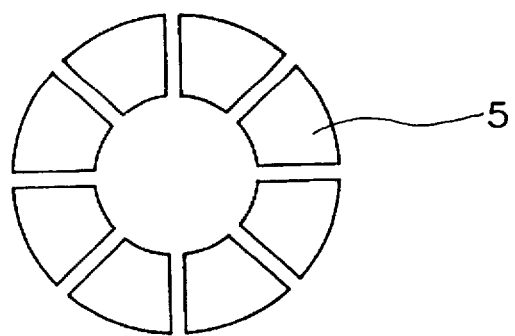
FIG. 1C shows a top view for the bottom detection electrode in the embodiment shown in FIG. 1A.

FIG. 1A is a top view for an embodiment of the invention, FIG. 1B is a section cut along the line A—A in the FIG. 1A, and FIG. 1C shows an top view for the bottom detection electrode in the embodiment shown in FIG. 1A. As shown in FIG. 1A to FIG. 1C, an embodiment of a vibrating disk type micro-gyroscope of the invention includes: a support platform 3 which is formed on a silicon wafer 1 near the center of a bottom surface of a vibrating disk 2 which supports the vibrating disk 2 with; the vibrating disk 2 being supported at the center thereof by the support platform 3 to provide a set spacing from the silicon wafer 1 for converting a resonance frequency $\Omega$ into the two nearby beat frequencies when rotated by the excitation of the electrostatic force of an upper drive electrode 4; a bottom detection electrode 5 coaxial with the axis of the vibrating disk 2, formed in a shape of a circle and divided into at least two pairs on the silicon wafer 1 for detecting the angular velocity of the vibrating disk 2 by sensing the electrostatic capacitance changes between the disk and the vibrating disk 2; a drive electrode 4, having one end divided into more than two pairs formed on the silicon wafer 1 at a set spacing from the bottom detection electrode 5 and the vibrating disk 2 in the radial direction and extending and bending sharply at the middle and another end formed above the vibrating disk 2 in the axial direction for driving the vibrating disk 2.

As it is shown in FIG. 1A to FIG. 1C, the center of the vibrating disk 2 is supported by the support platform, so that only the outer area relative to the center of the vibrating disk can vibrate.

The gyroscope shown in FIG. 1A to FIG. 1C has the vibrating disk 2 externally excited at the (0, 2) mode by the electrostatic force acting between the upper drive electrode 4 and the vibrating disk 2. For the external excitation at the modes (0, 4) and (0, 6), the upper drive electrode 4 is required to be divided into four and six parts, respectively.

The micro-gyroscope detects angular velocity by detection of the electrostatic capacitance changes between the bottom detection electrode and the vibrating disk 2. However while the magnitude of the angular velocity can be detected, the direction of the angular velocity cannot be detected if the bottom detection electrode 5 and upper drive electrode 4 have the same shape.

Polycrystalline silicon doped with either a p-type or an n-type dopant is used for the vibrating disk 2 because of its excellent fatigue strength. In order to simplify the manufacturing processes, polycrystalline silicon with either a p-type or an n-type dopant may be used for the bottom detection electrode 5 and the upper drive electrode 4.

Figure 2A:
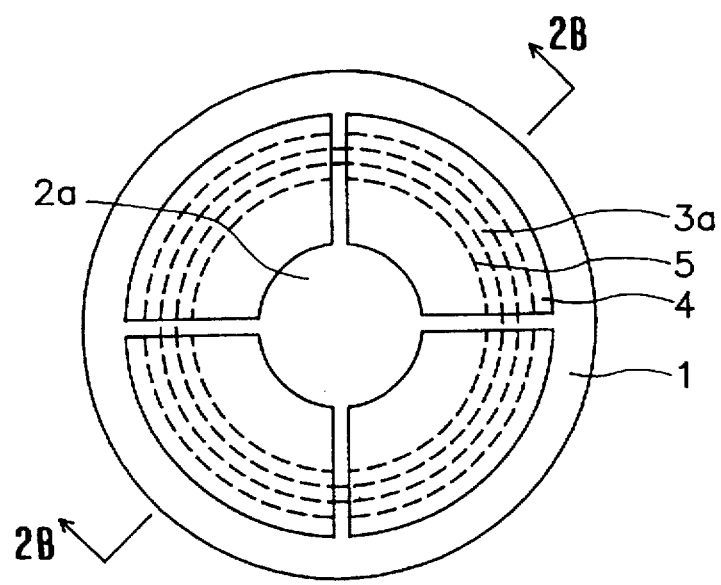
FIG. 2A is a top view for another embodiment of the invention.
Figure 2B:
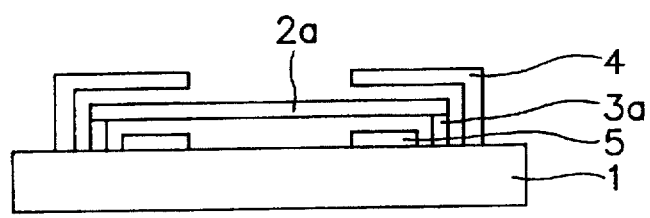
FIG. 2B is a section cut along the line B—B in the FIG. 2A.

FIG. 2A is a top view of another embodiment of the invention and FIG. 2B is a section view cut along the line B—B in FIG. 2A. Another embodiment of a vibrating disk type micro-gyroscope of the invention includes: a bottom detection electrode 5 formed in the shape of a circle divided into more than four pairs of parts for detecting the angular velocity of the micro-gyroscope with changes in electric capacitance between the micro-gyroscope and a vibrating disk 2a; a support platform 3a having a set spacing from the circumference of the bottom detection electrode 5 and a ring shape coaxial with the axis of the bottom detection electrode 5, and formed on a silicon wafer 1 for supporting the vibrating disk 2a; the vibrating disk 2a having a set spacing from the silicon wafer 1 and the bottom detection electrode 5, having an outer circumference formed on the support platform 3a and supported by the support platform 3a, for converting a resonance frequency $\Omega$ into the beat frequencies in the presence of the excitation by the electrostatic force between the disk and a 4 upper drive electrode; and the upper drive electrode 4 coaxial with the axis of the vibrating disk 2a, having a set spacing from the bottom detection electrode 5 and the vibrating disk 2a in the radial direction and one end formed on the silicon wafer 1 in the shape of a circle divided into more than two pairs of parts with each part being supported by the silicon wafer 1, and extending and bending sharply at the middle of itself toward the center axis, so another end is formed above the vibrating disk 2a with a set separation from the vibrating disk 2a in the axial direction, for driving the vibrating disk 2a.

Figure 3:
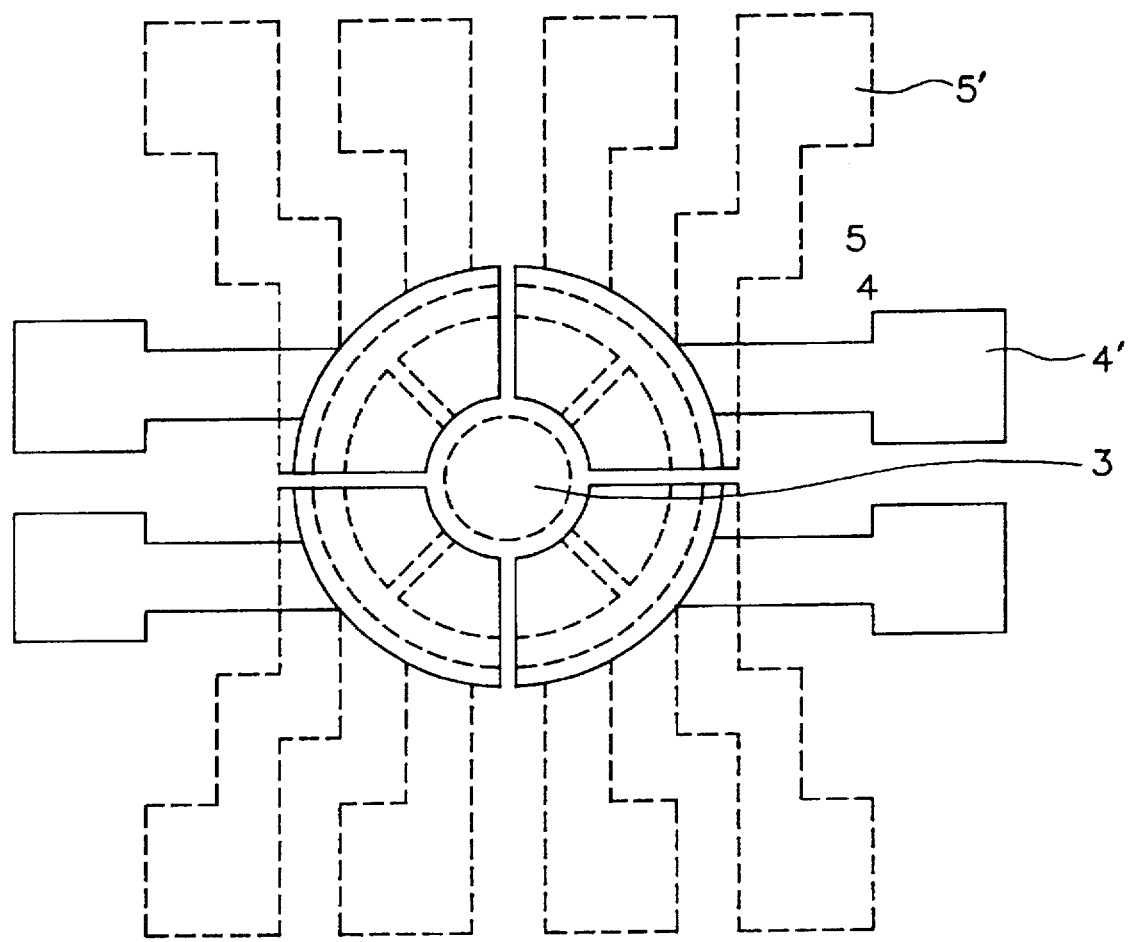
FIG. 3 is a schematic drawing showing external connections to the upper drive electrode and the bottom electrode shown in FIG. 1.

FIG. 3 is a schematic drawing showing external connections to the upper drive electrode 4 and the bottom detection electrode 5 of the micro-gyroscope. As shown in FIG. 4, there are half as many external connections 4' for the drive electrode compared to external connections 5' for the bottom detection electrode formed at the top and the bottom.

FIG. 4A to FIG. 4G shows a manufacturing process, using a micromachining process originally developed in the semiconductor field, for the micro-gyroscope of the invention.

With reference to FIGS. 4A to 4G the detailed description for the manufacturing process is described below.

Figure 4A:
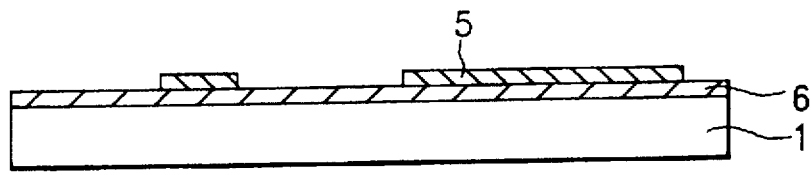
FIG. 4A to FIG. 4G shows a manufacturing process using micromachining, originally developed for semiconductors for areas of the micro-gyroscope of the invention.

First, an insulating layer 6 composed of 500Å–1500Å in thickness oxide and 1500Å–2500Å in thickness nitride is deposited on a silicon wafer 1, in order to insulate elements from one another. Polycrystalline silicon having $5 \times 10^{-19}$–$5 \times 10^{-20}$/cm$^3$ p-type or n-type dopant is deposited on this insulating layer 6. Then a bottom detection electrode 5 is formed after removing all the material except a certain area by conventional photolithography. These processes are illustrated in FIG. 4A.

Figure 4B:
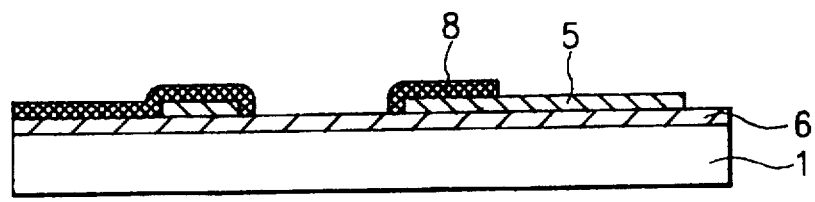
Figure 4C:
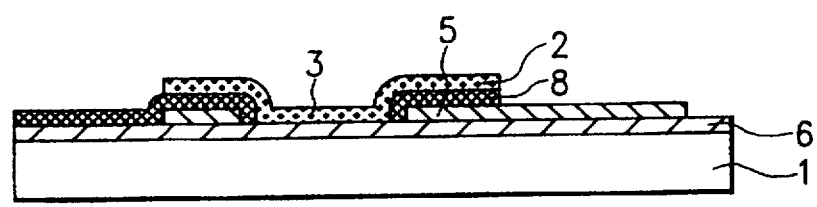

Next, in order to form a spacing between a vibrating disk 2 and the bottom detection electrode 5 as shown in FIG. 4B, a sacrificial layer, 0.5 to 1.0 µm in thickness of an oxide sensitive to wet etching, is deposited over the structure described in the preceding paragraph by PECVD(plasma enhanced chemical vapor deposition). In order to form a vibrating disk 2 and a support platform 3, a bottom sacrificial layer 8 is formed by dry etching with photoresist masks to expose the area between the bottom electrode parts, and the photoresist is removed subsequently.

After the operations of the preceding paragraph are performed, polycrystalline silicone, having excellent fatigue strength and containing the same dopant at the same concentration doped in the bottom detection electrode 5, is deposited on the bottom sacrificial layer 8, and then the area except the support platform 3 and the vibrating disk 2 are dry etched away to form the support platform 3 and the vibrating disk 2.

Figure 4D:
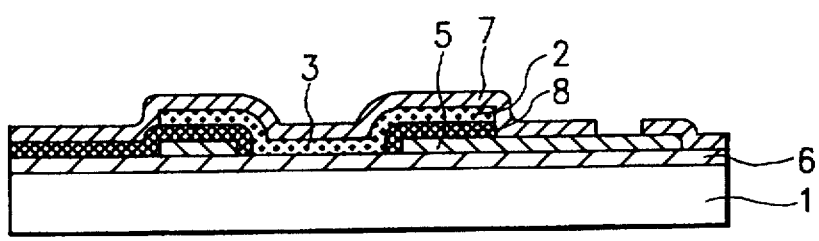
Figure 4E:
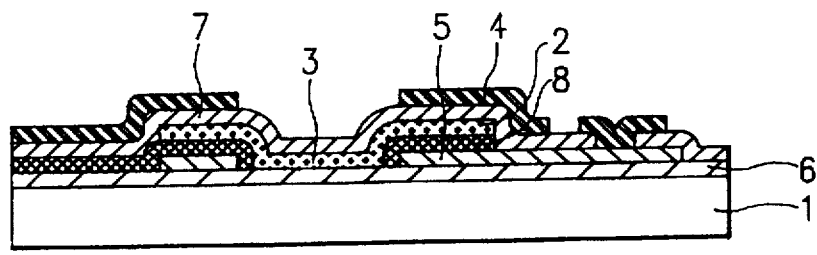

Subsequently, an upper sacrificial layer 7, 0.5 to 1.0 µm in thickness of an oxide layer, forming the space between the vibrating disk 2 and the upper drive electrode 4, is deposited over the support platform and the vibrating disk as shown in FIG. 4D. In order to form the upper drive electrode 4, a pattern is formed and then polycrystalline silicon doped with the same dopant at the same concentration of the bottom detection electrode 5 is deposited on the upper sacrificial layer 7 as in FIG. 4E.

Figure 4F:
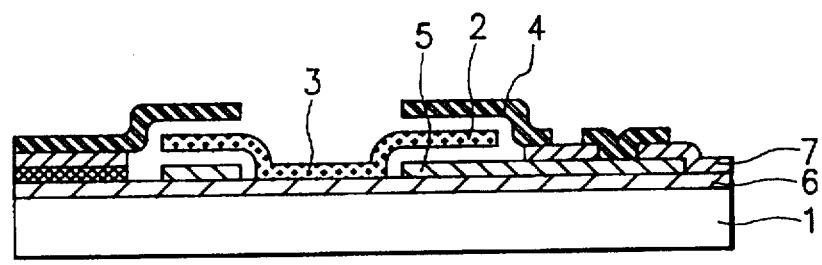

After the above operation, the upper sacrificial layer 7 and the bottom sacrificial layer 8 are wet etched, in order to form the space containing the vibrating disk 2, the upper drive electrode 4, and the bottom detection electrode 5 as shown in FIG. 4F. Vapor phase etching on the upper sacrificial layer 7 and the bottom sacrificial layer 8 may follow the above wet etching step, in order to prevent the adhesion of the vibrating disk 2, the upper drive electrode 4, and the bottom detection electrode 5 to one another during the time they are dried.

Figure 4G:
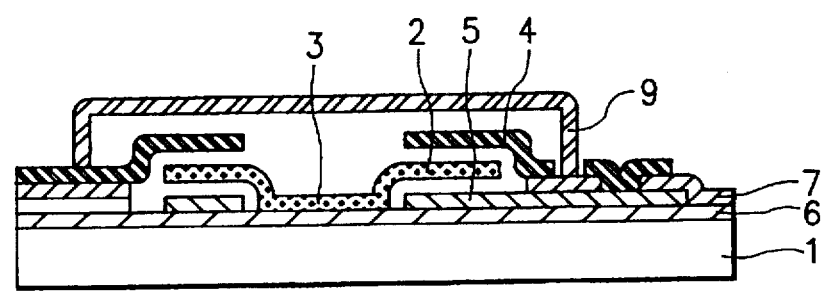

Finally, to minimize the air damping of the vibrating disk's vibration and to enhance the sensitivity of the micro-gyroscope with increased vibration efficiency, the micro-gyroscope may be sealed with a packaging structure which covers the gyroscope with a set spacing from the top surfaces of the upper drive electrode under $10^{-3}$ torr vacuum as in FIG. 4G.

The micro-gyroscope of the invention is smaller than gyroscopes of the prior art and offers more accurate and precise measurement of angular velocities. Also it measures, with high precision and accuracy, the direction of angular velocity as well as its magnitude.

In addition, the production method of the micro-gyroscope of the invention, which uses semiconductor manufacturing processes, enables economic mass-production of the gyroscope.

The micro-gyroscope of the invention has proven that it provides a small sized gyroscope of high accuracy and sensitivity for angular velocity measurement while providing economic mass production thereof.

What is claimed is:

1. A vibrating disk type micro-gyroscope comprising:
    a support platform formed on a silicon wafer;
    a vibrating disk supported at a center thereof by the support platform to provide a set spacing from the silicon wafer, for converting a resonance frequency into two beat frequencies when vibration of the disk is produced by an electrostatic force;
    a circle shaped bottom detection electrode coaxial with the vibrating disk divided into at least four pairs of parts on the silicon wafer, for detecting an angular velocity of the vibrating disk detected from an electrostatic capacitance change between the bottom electrode and the vibrating disk; and
    an upper drive electrode, having one end divided into at least two pairs of parts formed on the silicon wafer at a set spacing from the bottom detection electrode and the vibrating disk in a radial direction and extending and bending at a middle thereof and another end formed above the vibrating disk in an axial direction, for driving the vibrating disk.

2. A micro-gyroscope in accordance with claim 1, further comprising:

a sealing structure, placed over the micro-gyroscope at a set spacing from a top of the upper drive electrode, for providing a vacuum sealing of the micro-gyroscope.

3. A micro-gyroscope in accordance with claim 1, wherein:

the bottom detection electrode has twice as many pairs of parts in a shape of a divided circle as a number of pairs of parts of the upper drive electrode.

4. A micro-gyroscope in accordance with claim 1, wherein:

the vibrating disk, the upper drive electrode, and the bottom detection electrode are made of polycrystalline silicon doped with either a p-type or a n-type dopant.

5. A micro-gyroscope comprising:

a circle shaped bottom detection electrode, formed on a silicon wafer and divided into at least four pairs of parts, for detecting an angular velocity of the micro-gyroscope by detection of electrostatic capacitance changes;

a ring-shaped support platform having a set spacing from a circumference of the bottom detection electrode and coaxial with an axis of the bottom detection electrode, and formed on the silicon wafer;

a vibrating disk having a set spacing from the silicon wafer and the bottom detection electrode, having an outer circumference formed on the support platform which is supported by the support platform, for converting a resonance frequency into two beat frequencies in a presence of an excitation by an electrostatic force; and a circle shaped upper drive electrode coaxial with an axis of the vibrating disk, having a set spacing from the bottom detection electrode and the vibrating disk in the radial direction, having one end formed on the silicon wafer divided into at least two pairs of parts with each part being supported by the silicon wafer, extending upward and bending at a middle thereof toward the axis of the vibrating disk, and another end formed above the vibrating disk having a set spacing from the vibrating disk in an axial direction, for driving the vibrating disk.

\* \* \* \* \*